United States Patent

[11] 3,623,502

[72] Inventor  Harry L. Giwosky
              Milwaukee, Wis.
[21] Appl. No. 52,602
[22] Filed     July 6, 1970
[45] Patented  Nov. 30, 1971
[73] Assignee  Controls Company of America
              Melrose Park, Ill.

[54] SAFETY FLOAT FOR OIL CONTROL VALVE
     9 Claims, 4 Drawing Figs.
[52] U.S. Cl. .................................................... 137/400
[51] Int. Cl. ................................................ F16k 31/28
[50] Field of Search ........................................... 137/400,
                                                         405, 409, 423

[56]                References Cited
                UNITED STATES PATENTS
2,197,262   4/1940   Russel ......................... 137/400 X
2,293,903   8/1942   Johnson ...................... 137/400 X
3,077,897   2/1963   Jaschinsky et al. ............ 137/400

Primary Examiner—M. Cary Nelson
Assistant Examiner—David R. Matthews
Attorneys—John W. Michael, Gerrit F. Foster, Bayard H. Michael, Paul R. Puerner, Joseph A. Gemignani, Andrew O. Riteris and Spencer B. Michael ABSTRACT: The pivoted main float acts on the inlet valve to regulate flow into the float chamber to maintain a constant level. The auxiliary float carried by the main float has its center of buoyancy under normal conditions located at $CB_1$, which is to the right of the pivot for the auxiliary float and, as such, merely adds its buoyance to that main float. If the inlet valve should leak, the oil level in the chamber rises and starts to float the other arm of the auxiliary float, causing the center of buoyancy to shift to $CB_2$, which will cause the auxiliary float to exert additional force on the inlet valve in the closing direction and will also swing the auxiliary float to a position blocking return of the float to the normal position until manually reset. The manually operated knob regulates rotation of the metering disc to control the flow rate through the outlet. The undulating surface engaged by the rollers is a detent mechanism cooperating with the metering disc and knob to index the metering disc and knob to their various operative positions.

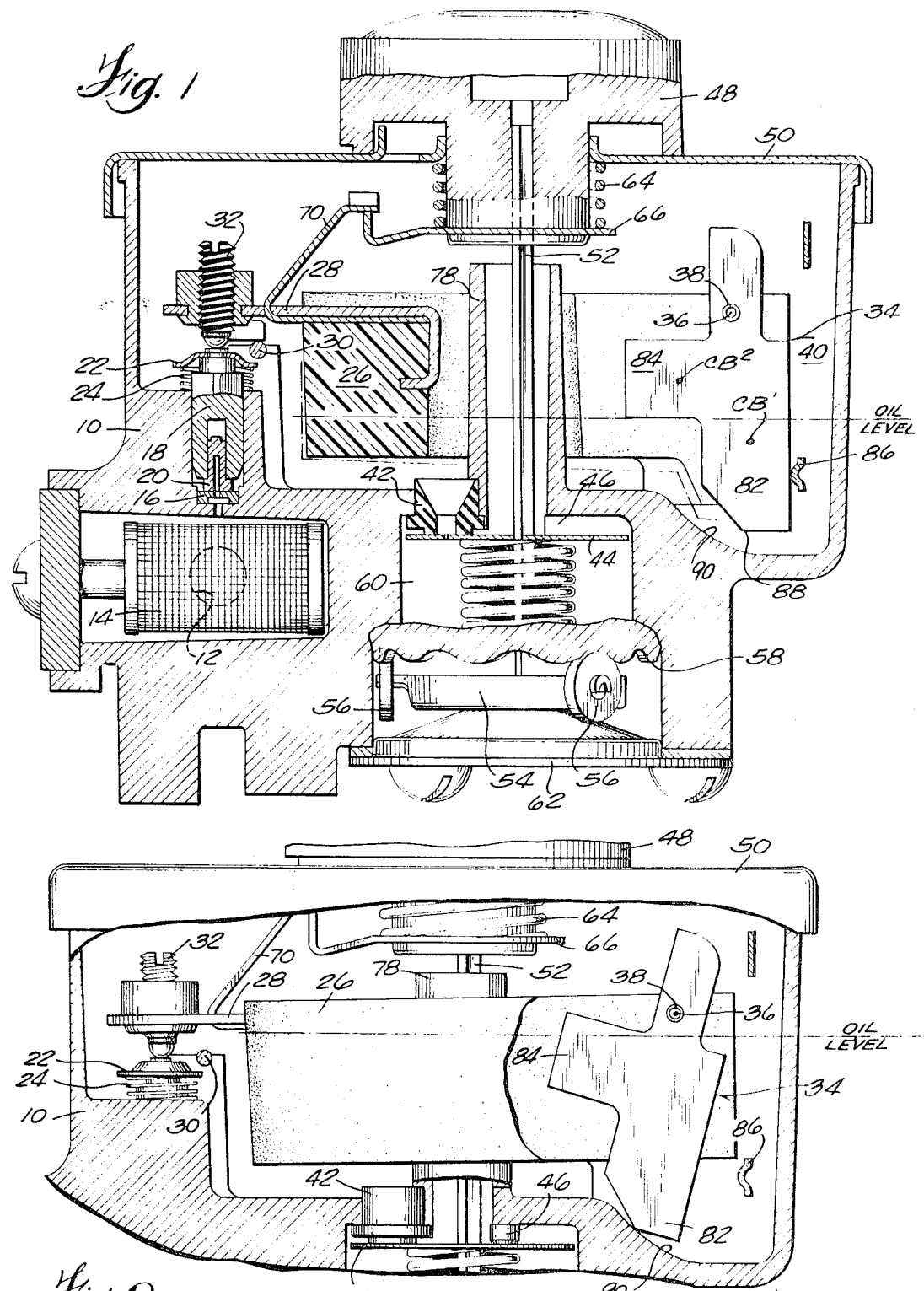

Inventor
Harry L. Giwosky
By Bayard H. Michael
Attorney 3,623,502

SAFETY FLOAT FOR OIL CONTROL VALVE

CROSS-REFERENCE TO RELATED APPLICATION

The metering disc arrangement is more fully described and is claimed in my copending application, Ser. No. 52,603, filed July 6, 1970.

BACKGROUND OF INVENTION

It is customary for oil controls to be provided with a safety mechanism operative in the case of a leaking inlet valve to respond to an abnormally high level in the float chamber to exert additional closing force on the inlet valve either through a trip mechanism or other arrangements. It is desirable that once the safety mechanism has operated, it require a positive resetting action in order to place the control back into operation.

SUMMARY OF INVENTION

This invention is directed to the provision of a safety float arrangement which is low in cost and completely reliable while meeting the requirement that positive resetting action precede placing the control back into operation. The construction described in the Abstract is extremely simple and positive in operation while avoiding application of excessive forces to the inlet valve which could damage the inlet valve.

DESCRIPTION OF DRAWINGS

FIG. 1 is a vertical section through an oil control provided with the present safety float mechanism.

FIG. 2 is a fragmentary section showing the safety float in its operative position.

DESCRIPTION OF PREFERRED EMBODIMENT

Figure 3:
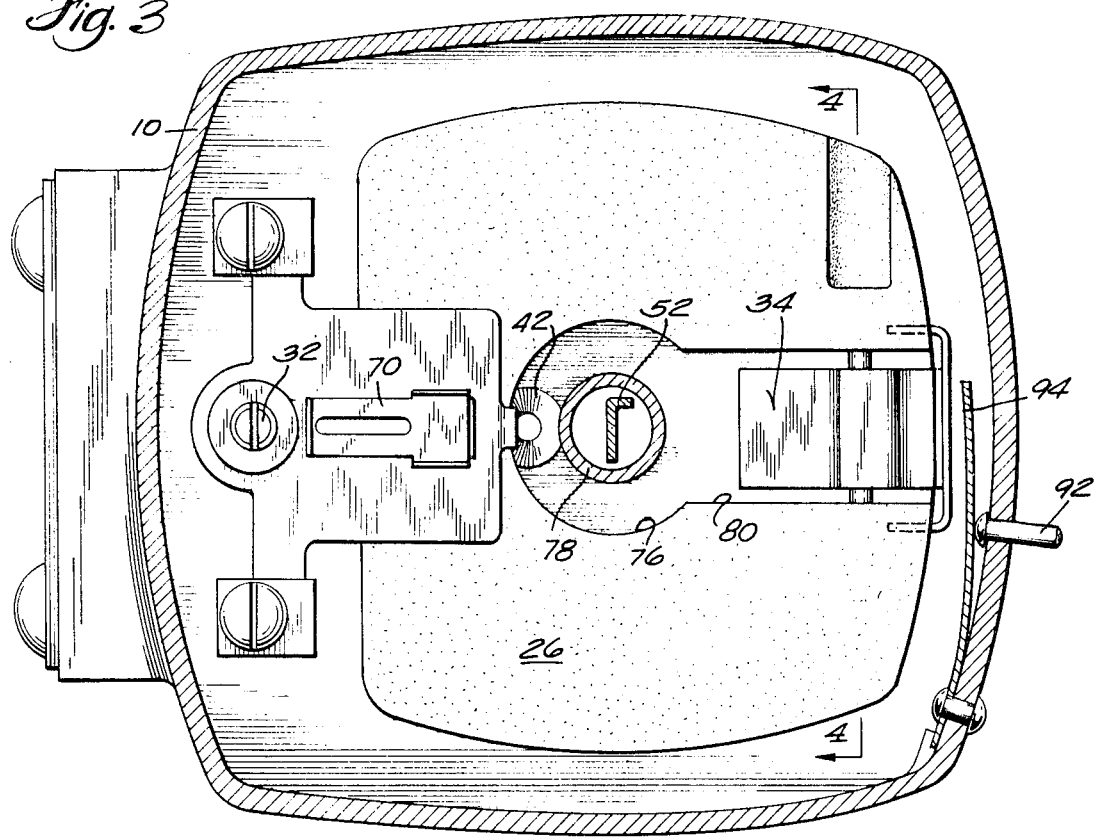
FIG. 3 is a horizontal section looking down on top of the float mechanism and the associated apparatus.
Figure 4:
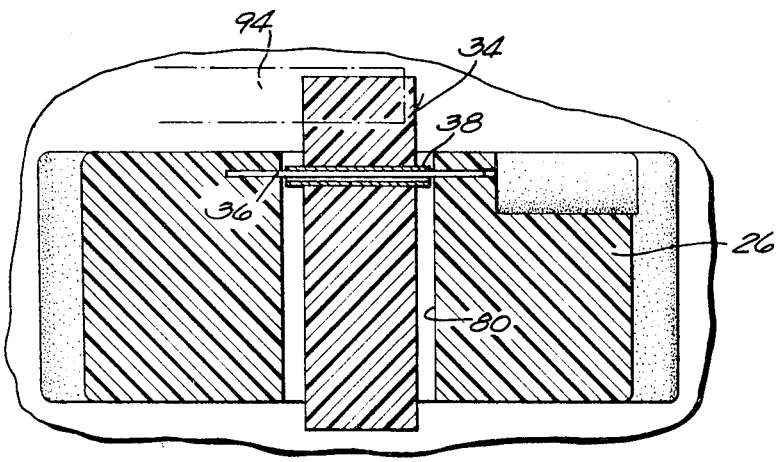
FIG. 4 is a view taken on line 4—4 of FIG. 3 to further illustrate the safety float and the manner in which it is mounted.

The control valve includes a body 10 having an inlet 12 for oil flow through the filter 14 to valve seat 16. Valve 18 has a resilient tip 20 which moves to and from the seat to control flow through the inlet orifice and past the valve body which is square in cross section and, therefore, provides flow passage between it and the bore in which it operates. The upper end of the valve 18 provided with a spring seat 22 against which the compressed spring 24 acts to urge the valve in the opening direction. The main float 26 is carried on bracket 28 which is pivoted at 30 so that rising oil level will lift the float about pivot 30 to depress the adjustable valve actuator 32 against the upper end of valve 18 to move the valve in the closing direction. The main float also supports safety float 34 on a piece of music wire 36 passing through plastic tube 38 in the safety float and supported in the main float, as seen best in FIG. 4.

The normal oil level in the float chamber 40 is indicated on FIG. 1 and imposes a pressure head on the pressed-in, plastic, outlet fitting 42 under which there is a rotatable metering disc 44 having various metering orifices therein which can be registered with the outlet fitting 42. The disc 44 is urged upwardly against the fitting 42 and two additional bosses 46 (only one is shown) equally spaced from the fitting so as to give the disc a three-point support. The disc is rotated by means of knob 48 standing above the cover 50 and connected to shaft 52 which engages the disc and carrier 54 which supports three wheels 56 which are urged upwardly to ride against the undulating surface 58 cast in the bottom of cavity 60 so as to obtain a detent action cooperating with the disc and knob in securing proper orientation of the metering orifices relative to the outlet fitting 42. Cavity 60 is closed at the bottom by means of cover 62. Complete details of this metering disc and indexing arrangement can be found in the copending application, Ser. No. 52,603.

The knob is retained against the cover by means of compressed spring 64 acting against plate 66 rocakably fixed relative to the shaft 52 and having a projecting finger 68 which can ride under the end of link 70 carried by the float bracket so that in the "off" position of the knob the projecting arm 68 exerts a yielding, upward force on the link which, in turn, causes valve actuator 32 to act downwardly against the valve and close the valve regardless of the oil level in flow chamber 40.

It will be noted that the main float 26 has a central aperture 76 through which the upstanding weir 78 projects. This weir serves the function of venting any air in the outlet chamber 60 and providing emergency overflow should the safety float mechanism not be adequate to stop inlet valve leakage. The main float also has a notch 80 in which the safety float 34 is pivotally mounted, as mentioned before. The safety float is in the form of an inverted L with a depending, long leg 82 and a shorter, horizontal leg 84. As may be seen in FIG. 1, the normal oil level in the float chamber 40 only submerges the depending, long leg 82 and the center of buoyancy of this submerged portion is designated as $CB_1$. This center of buoyancy is to the right of the pivot and, hence, tries to move the float counterclockwise about its pivot. This movement is resisted by the stop 86 which is simply a staple driven into the foamed polyurethane float. It will be appreciated, of course, that the buoyancy of the safety float in normal operation, to the extent that it is submerged, is added to the main float buoyancy by reason of transfer of forces through the pivot. If the oil level in the float chamber 40 rises above normal due to an obstruction at the inlet valve, the short, horizontal leg 84 of the safety float 34 will gradually become submerged. The center of buoyancy of this leg is indicated at $CB_2$ and, as a result of the gradual submergence of the short leg, the center of buoyancy of the entire safety float will gradually shift until it is to the left of the pivot of the safety float, at which time the safety float will swing to the position shown in FIG. 2. In this position the safety float has moved the lower corner 88 into a wedging relationship with the sloped surface 90 in the bottom of the float chamber. It will be appreciated that even when the oil level drops, the weight of the float mechanism now acts to the left of the pivot point for the safety float in a position tending to move to move the safety float further in a clockwise direction about its pivot. This, obviously, cannot happen but, on the other hand, the control cannot be self-restoring. To place the control back into operation, the externally accessible pin 92 must be depressed to move the leaf float spring reset 94 against the upstanding arm 96 of the safety float to move it in a counterclockwise direction about its pivot until the buoyancy of the lower leg 82 takes over and holds the safety float against its stop 86.

I claim:

1. A constant level device comprising, a housing having a float chamber and an inlet to and an outlet from the chamber an inlet valve for controlling flow into the chamber through the outlet, outlet valve means for regulating flow from the chamber through the outlet, a main float in the chamber operatively connected to the inlet valve to regulate movement thereof to maintain a normal constant level in the chamber, a safety float in the chamber retained in an inoperative position at normal levels in the chamber and responsive to an abnormally high level to move to a position which it prevents lowering of the main float and normal regulation of the inlet valve until the safety float has been reset to its inoperative position, and means for resetting the safety float from its operative position to its inoperative position.

2. A device according to claim 1 in which the buoyancy of the main float increases as the level is increased above the normal level.

3. A device according to claim 2 in which the buoyancy of the safety float increases as the level is increased above normal level and is added to the buoyancy of the main float in determining the force acting on the inlet valve.

4. A device according to claim 3 in which the safety float is carried by the main float.

5. A device according to claim 4 in which the safety float is pivoted on the main float.

6. A device according to claim 5 in which the safety float is shaped so its center of buoyancy acts relative to the pivoted mounting for the safety float in a direction urging the float to the inoperative position.

7. A device according to claim 6 in which the safety float center of buoyancy shifts relative to the pivot as the level rises to an abnormal level until the float rotates to its operative position.

8. A device according to claim 7 in which the safety float engages a portion of the housing in the chamber in the operative position whereby the force acting on the safety float both while the abnormal level continues and after the level is reduced acts to hold the safety float in engagement with the housing and prevent operation of the main float, said reset means acting on the safety float to force it back to its inoperative position.

9. A device according to claim 8 in which the safety float is in the shape of an inverted "L" with the depending leg normally being in the liquid and the horizontal leg being submerged by the rising liquid level as the normal level is exceeded.

* * * * *

PO-1050
(5/69)

UNITED STATES PATENT OFFICE
CERTIFICATE OF CORRECTION

Patent No. 3,623,502                Dated November 30, 1971

Inventor(s) Harry L. Giwosky

It is certified that error appears in the above-identified patent and that said Letters Patent are hereby corrected as shown below:

Claim 1, column 2, line 59, "outlet" should read
      -- inlet --;
                      line 67, after "position" insert
    -- in --.

Signed and sealed this 27th day of June 1972.

(SEAL)
Attest:

EDWARD M. FLETCHER, JR.          ROBERT GOTTSCHALK
Attesting Officer                    Commissioner of Patents